US005799970A

United States Patent [19]
Enders

[11] Patent Number: 5,799,970
[45] Date of Patent: Sep. 1, 1998

[54] EXTERNALLY MOUNTED SIDE AIRBAG MODULE WITH DECORATIVE OUTER COVER

[75] Inventor: Mark L. Enders, Ogden, Utah

[73] Assignee: Autoliv ASP, Inc., Ogden, Utah

[21] Appl. No.: 724,418

[22] Filed: Oct. 1, 1996

[51] Int. Cl.$^6$ ............................................. B60R 21/22
[52] U.S. Cl. .............................. 280/730.2; 280/728.2
[58] Field of Search ........................... 280/730.2, 728.2, 280/730.1, 743.1

[56] References Cited

U.S. PATENT DOCUMENTS

| | | | |
|---|---|---|---|
| 5,498,030 | 3/1996 | Hill et al. | 280/743.1 |
| 5,533,750 | 7/1996 | Karlow et al. | 280/730.2 |
| 5,547,214 | 8/1996 | Zimmerman, II et al. | 280/730.1 |
| 5,556,127 | 9/1996 | Hurford et al. | 280/730.2 |
| 5,588,671 | 12/1996 | Boumarafi et al. | 280/730.2 |

*Primary Examiner*—Kenneth R. Rice

[57] ABSTRACT

A side airbag module adapted to mount within an external recess of a vehicle seat, the recess providing access to an internal structural member of the seat with a substantially continuous fabric hook connected to upholstery surrounding the recess. The side airbag module includes a dish-shaped module housing, an airbag cushion and an inflator secured within the module housing, a lid closing the module housing and covering the airbag cushion and inflator, a trim ring, and a mounting projection for securing the airbag module to the internal structural member of the seat. The module housing includes a sidewall and an elongated rail running along an outer face of the sidewall and having a flange for catching the fabric hook of the seat to pull the seat upholstery tightly around the recess when the airbag module is mounted therein. The sidewall defines a plurality of cover openings receiving stakes extending from the lid, with distal ends of the stakes being deformed, securing the stakes within the cover openings and securing the lid to the module housing. The sidewall also defines a plurality of trim openings receiving trim hooks extending from the trim ring securing the trim ring to the module housing. The trim ring covers any gap between the lid of the module cover and the seat recess when the airbag module is mounted within the recess and provides an aesthetically pleasing finish to the externally mounted airbag module.

22 Claims, 8 Drawing Sheets

EXTERNALLY MOUNTED SIDE AIRBAG MODULE WITH DECORATIVE OUTER COVER

FIELD OF THE INVENTION

The present invention relates to an airbag module and, more particularly, to an externally mounted side airbag module with a decorative outer cover.

BACKGROUND OF THE INVENTION

Providing a side airbag module that can be securely and easily mounted on the exterior of a vehicle driver or passenger seat back with minimal changes to the design and manufacture of the seat would be useful. An airbag module is part of an inflatable restraint system that is employed in a vehicle (in particular an automobile) for protecting an occupant against injury by deploying an inflated airbag cushion to physically restrain the occupant's body when the vehicle encounters a collision. The airbag module normally includes an airbag cushion and an inflator that, once triggered by a remote collision sensor, provides the inflation gas for inflating the airbag cushion. As its name implies, a side airbag module protects an occupant against an impact to the side of the vehicle and is normally positioned somewhere between the occupant and the side of the vehicle closest to the occupant. One of the options for a side airbag location which has proven advantageous is on the side of a seat back of a seat, adjacent the center pillar of the auto. This location is advantageous because the airbag cushion is kept in the optimum deployment position, adjacent the occupant's upper body, as the seat back is adjusted.

Currently, auto manufacturers are divided on the ideal placement of the side airbag modules. Some manufacturers prefer to mount the side airbag modules internally within the seat behind the padding and the upholstery of the seat cover, whereas other manufacturers prefer to mount the side airbag module externally as a decorative component of the vehicle. While there are numerous advantages and disadvantages to both types of side airbag modules, there are current applications which warrant externally mounted side airbag modules. There is, therefore, a need for a side airbag module that mounts on the exterior of an assembled seat. Preferably, the side airbag module can be mounted to the exterior of a seat during final assembly of the vehicle, and the side airbag module does not adversely affect the outer contour of the seat.

SUMMARY OF THE INVENTION

An object, therefore, of the present invention is to provide a new and improved side airbag module.

Another object of the present invention is to provide an externally mounted side airbag module having a decorative outer cover.

An additional object of the present invention is to provide an externally mounted side airbag module that can be securely and easily mounted to an exterior of the side of a seat back of a seat and does not require substantial changes to the outer contour of the seat or an external attachment means provided by the seat manufacturer.

In carrying out this invention, there is provided a module housing for use as part of a side airbag module for mounting in a vehicle seat. The airbag module housing includes an elongated, generally flat base and a sidewall extending upwardly from the base to an open top of the module housing. The sidewall has a first side and an opposing second side. An elongated first rail portion runs along an outer face of the first side of the sidewall, and an elongated second rail portion runs along an outer face of the second side of the sidewall. Each of the first and the second rail portions are generally parallel with the open top and have a flange for catching a fabric hook of the vehicle seat.

According to one aspect of the present invention, the airbag module housing further includes a first row of spaced-apart cover openings defined in the first side of the sidewall, generally parallel with the open top. A second row of spaced-apart cover openings are defined in the second side of the sidewall generally parallel with the open top.

According to another aspect of the present invention, the sidewall is substantially continuous and further includes a first end and an opposing second end, with the first end defining an inflator access port. The first rail portion and the second rail portion are part of a substantially continuous rail encircling the substantially continuous sidewall.

According to an additional aspect of the present invention, the airbag module housing further includes a substantially continuous row of spaced-apart trim openings defined in the sidewall generally parallel with the open top.

According to a further aspect of the present invention, the rail is positioned above the first and the second rows of cover openings and below the row of trim openings. The flange of the rail includes a first portion extending over the row of the trim openings and a lower portion for catching the fabric hook of the vehicle seat.

The present invention also provides a side airbag module adapted to mount within an external recess of a vehicle seat, the recess providing access to an internal structural member of the seat with a substantially continuous fabric hook connected to upholstery surrounding the recess. The side airbag module includes an airbag module housing having an elongated generally flat base and a sidewall extending upwardly from the base to an open top of the module housing. The sidewall has a first side and an opposing second side, and an elongated first rail portion runs along an outer surface of the first side of the sidewall generally parallel with the open top. An elongated second rail portion runs along an outer surface of the second side of the sidewall generally parallel with the open top. The module housing is fitable within the recess of the vehicle seat with the open top facing out of the recess and the first and the second rail portions each having a flange adapted to catch the fabric hook to pull the seat upholstery tightly around the recess.

The side airbag module also includes an inflator and a folded airbag cushion in communication so that inflation gas from the inflator will inflate the airbag cushion. The airbag cushion and the inflator are secured within the module housing with the airbag cushion positioned between the inflator and the open top of the module housing. A module cover defines at least one tear seam and includes a lid closing the open top of the module housing and means securing the lid to the module housing. The side airbag module further includes means for securing the airbag module to the internal structural member of the seat.

According to one aspect of the present invention, the module housing of the side airbag module further includes a row of spaced-apart trim openings defined in the sidewall generally parallel with the open top. The airbag module further includes a generally flat trim ring covering an outer peripheral edge of the lid of the module cover and adapted to cover any gap between the recess of the seat and the lid and an outer periphery of the recess. The trim ring has a plurality of spaced-apart trim hooks extending from the trim ring, with each trim hook secured in a trim opening of the row of trim openings of the module housing, securing the trim ring to the airbag module.

The present invention additionally provides a vehicle seat assembly including a vehicle seat and the side airbag module described above. The vehicle seat has an external recess providing access to an internal structural member of the vehicle seat with a substantially continuous fabric hook connected to upholstery surrounding the recess. The module housing of the side airbag module fits within the recess of the vehicle seat with the open top of the module housing facing out of the recess, and the flanges of the first and the second rail portions catch the fabric hook and pull the seat upholstery tightly around the recess. Means secure the airbag module to the internal structural member of the vehicle seat.

The present invention provides another side airbag module adapted to mount within an external recess of an vehicle seat, the recess providing access to an internal structural member of the seat. The side airbag module includes an airbag module housing having an elongated generally flat base and a sidewall extending upwardly from the base to an open top of the module housing. The sidewall has a first side and an opposing second side, and a first row of spaced-apart cover openings is defined in the first side of the sidewall generally parallel with the open top, and a second row of spaced-apart cover openings is defined in the second side of the sidewall generally parallel with the open top. The module housing is fitable within the recess of the vehicle seat with the open top facing out of the recess.

The side airbag module also includes an inflator and a folded airbag cushion in communication so that inflation gas from the inflator will inflate the airbag cushion. The inflator and the airbag cushion are secured within the module housing with the airbag cushion positioned between the inflator and the open top of the module housing. A module cover defines at least one tear seam and includes a generally flat lid closing the open top of the module housing.

The module cover also includes a first attachment arm extending from the lid and terminating at a bottom edge butting against an inner face of the first side of the sidewall of the module housing in alignment with the first row of cover openings. A plurality of spaced-apart stakes extend from the bottom edge of the first attachment arm. Each of the stakes extends through one of the openings of the first row of cover openings and terminates at distal ends, with means securing the distal ends of the stakes against an outer surface of the first side of the sidewall so that the stakes cannot be withdrawn from the openings. A second attachment arm extends from the lid and terminates at a bottom edge butting against an inner surface of the second side of the sidewall of the module housing in alignment with the second row of cover openings, with a plurality of spaced-apart stakes extending from the bottom edge of the second attachment arm. Each of the stakes extends through one of the openings of the second row of cover openings and terminates in distal ends. Means secure the distal ends of the stakes against an outer surface of the second side of the sidewall so that the stakes cannot be withdrawn from said openings, securing the module cover to the module housing. The side airbag module also includes means for securing the airbag module to the internal structural member of the vehicle seat.

The present invention provides another vehicle seat assembly including a vehicle seat and the side airbag module described above. The vehicle seat has an external recess providing access to an internal structural member of the vehicle seat. The module housing of the side airbag module fits within the recess of the vehicle seat with the open top of the module housing facing out of the recess, and means secure the airbag module to the internal structural member of the vehicle seat.

In summary, the present invention provides a side airbag module that securely and easily mounts on the exterior of a seat back, secured to internal structure within the seat, and does not require substantial changes to the outer contour of the seat or an external attachment means provided by the seat manufacturer.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
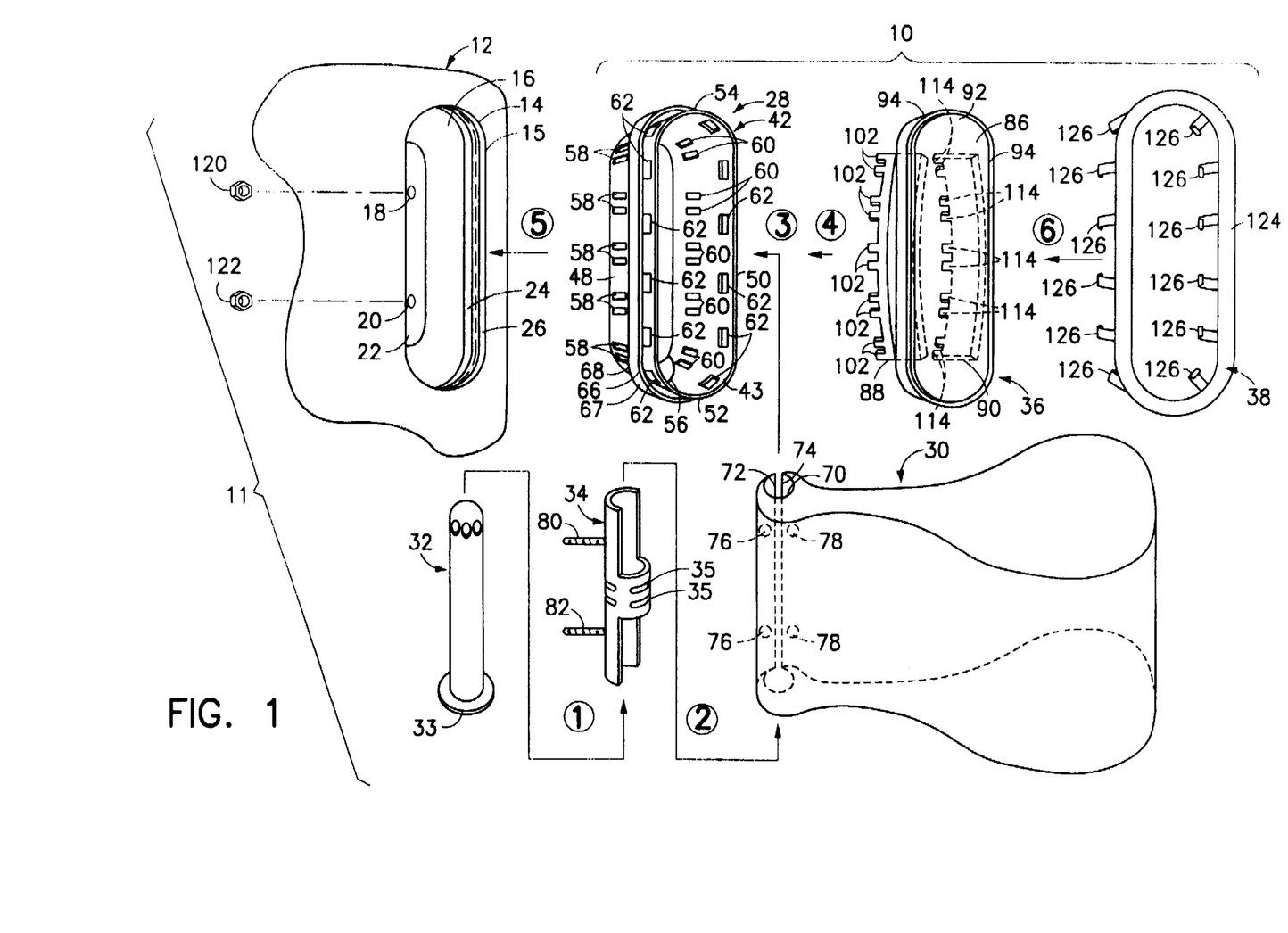
FIG. 1 is an exploded perspective view of a vehicle seat assembly according to the present invention, including a side airbag module mounted within a recess in a side of a seat back of a vehicle seat.
Figure 2:
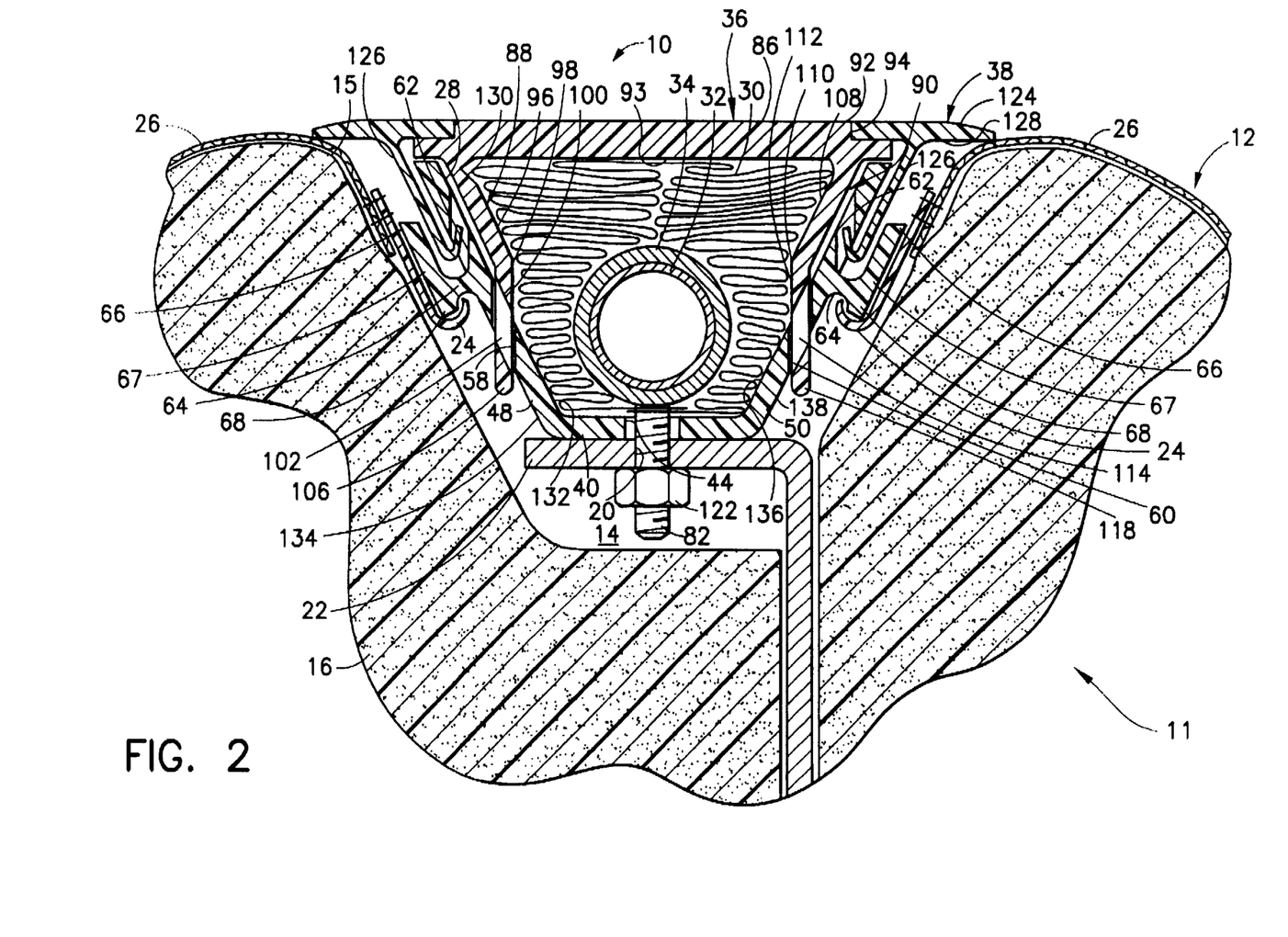
FIG. 2 is a sectional end view of the vehicle seat assembly of FIG. 1.

Referring first to FIGS. 1 and 2, the present invention is directed to a side airbag module 10 adapted to mount on the exterior of the side of a seat back of a vehicle seat 12 having a dish-shaped recess 14. The recess 14 of the seat 12 provides access through foam or cushion 16 of the seat to two (2) spaced-apart bolt holes 18,20 defined by an internal structural member 22 of the seat. A continuous fabric hook 24, connected to surrounding seat upholstery 26, is positioned about the periphery of the recess 14. The side airbag module 10 includes a module housing 28, an airbag cushion 30, an inflator 32, an inflator sleeve 34, a module cover 36 and a trim ring 38. The side airbag module 10 and vehicle seat 12 together form a vehicle seat assembly 11.

Figure 3:
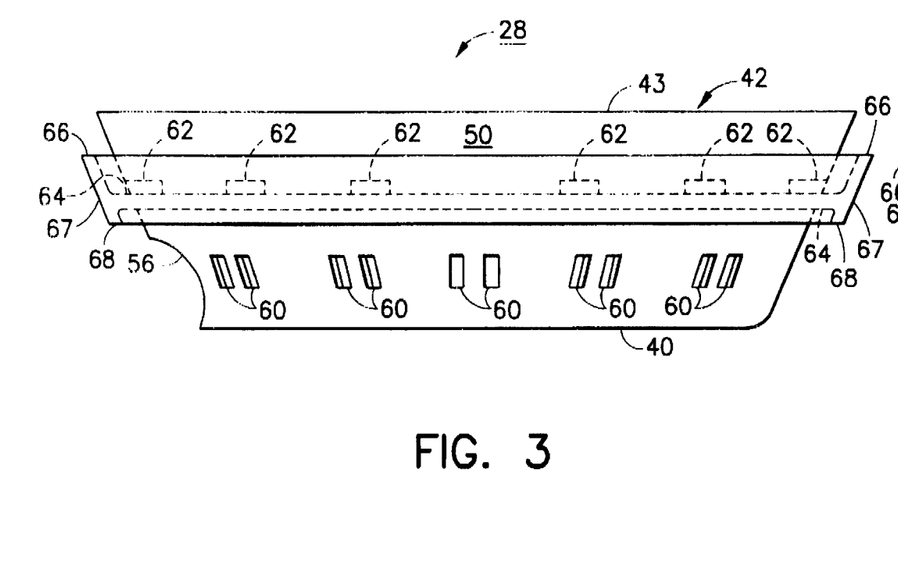
FIG. 3 is a side plan view of a module housing of the side airbag module of FIGS. 1 and 2.
Figure 4:
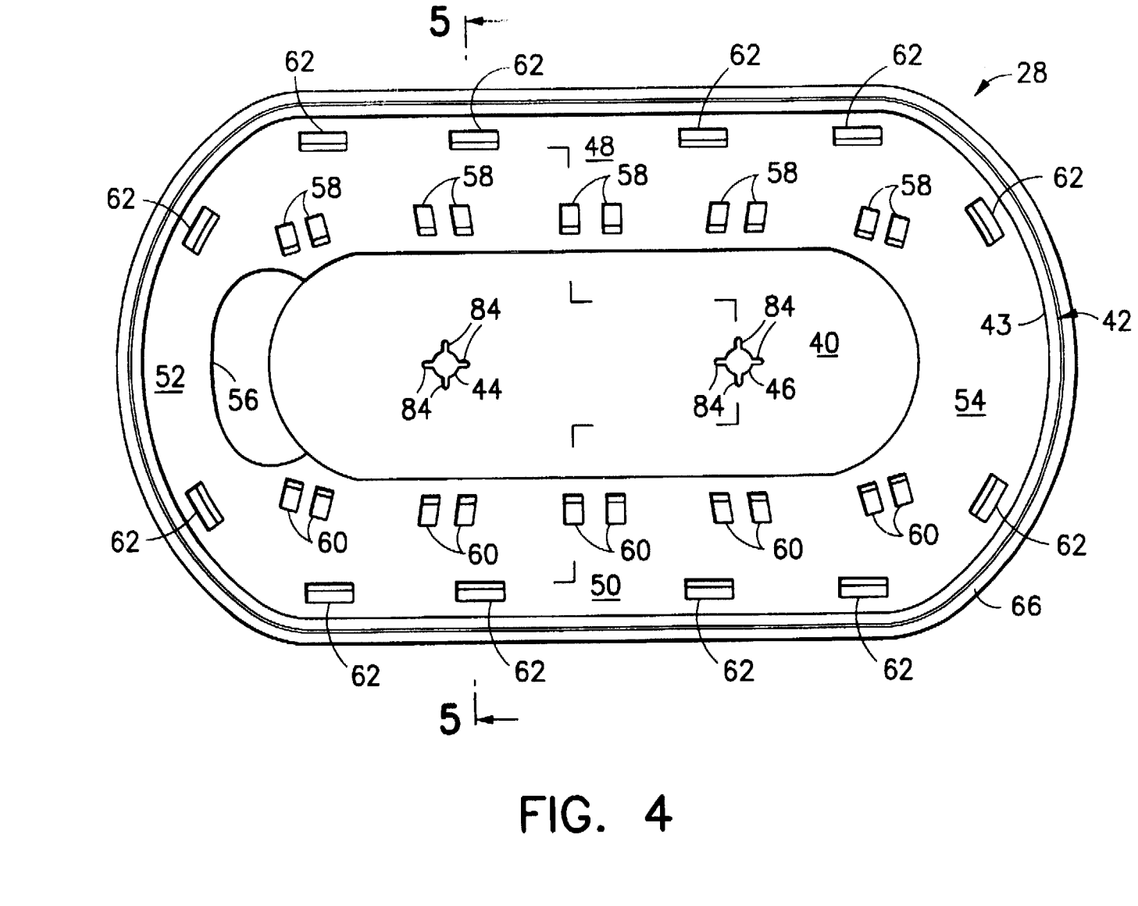
FIG. 4 is a top plan view of the module housing of FIG. 3.
Figure 5:
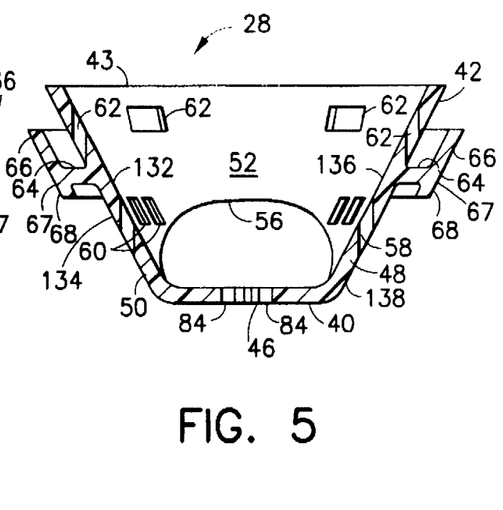
FIG. 5 is a sectional view of the module housing taken along the line 5—5 of FIG. 4.

Referring also to FIGS. 3 through 5, the module housing 28 is generally dish-shaped and includes an elongated, generally flat base 40 and a generally continuous sidewall 42 extending upwardly and sloping outwardly from the base to an open top 43 of the module housing. The base 40 defines two (2) spaced-apart mounting projection apertures in the form of bolt holes 44,46, and the sidewall 42 includes a first side 48, an opposing second side 50 and a first end 52 and an opposing second end 54. The first end 52 of the sidewall 42 defines an inflator access port 56. It should be noted that the sidewall 42 does not have to be continuous but should include the opposing first and the second sides 48,50.

A first row of five (5) spaced-apart pairs of cover openings 58 is defined by the first side 48 of the sidewall 42 parallel with the open top 43, and an opposing second row of five (5) spaced-apart pairs of cover openings 60 is defined by the second side 50 of the sidewall 42 parallel with the open top. A substantially continuous row of twelve (12) spaced-apart trim openings 62 is defined by the sidewall 42 above the first and the second row of cover openings 58,60 and parallel with the open top 43.

An elongated, continuous rail 64 extends outwardly from and generally perpendicular to an outer face of the sidewall 42 above the first and the second row of cover openings 58,60 and below the row of trim openings 62. The rail 64 runs along the sidewall 42 generally parallel with the open top 43. The rail 64 includes a flange 67 extending outwardly from and generally perpendicular to the rail, parallel with the sidewall 42, and having a first portion 66 extending over the row of trim openings 62 and a second portion 68 for catching the fabric hook 24 of the vehicle seat 12 as described in more detail below. The rail 64 does not necessarily have to be continuous but should include a first rail portion running along the outer face of the first side 48 of the sidewall 42 and a second rail portion running along the outer face of the second side 50 of the sidewall. The module housing 28 is made from a suitable material, preferably a toughened nylon such as Zytel for example, a product of E.I. DuPont de Nemours Co., and the module housing is molded as a single piece.

The airbag cushion 30, the inflator 32 and the inflator sleeve 34 are known in the art and therefore not described here in detail except as to how they are mounted within the airbag module 10. The airbag cushion 30 and inflator 32 are assembled together so that inflation gas from the inflator will inflate the airbag cushion. The airbag cushion 30 includes an elongated mouth 70 having a first side 72 and a second side 74, with the first side defining two spaced-apart fastener holes 76 and the second side defining two spaced-apart fastener holes 78. The inflator 32 is press fit and secured within the inflator sleeve 34, by crimps 35 formed in the inflator sleeve, and the inflator and inflator sleeve are positioned within the mouth 70 of the airbag cushion 30. Two (2) mounting projections in the form of threaded studs 80,82 extend from the inflator sleeve 34 and the first side 72 and the second side 74 of the mouth 70 of the airbag cushion overlap around the inflator and the inflator sleeve with the two studs passing through the two fastener holes 76 of the first side of the mouth of the airbag cushion and the two fastener holes 78 of the second side of the mouth. It should be noted that more or less than two threaded studs 80,82 can be provided, or that the mounting projection can be something other than threaded studs. The mounting projection could be in the form of a mounting flange having self fasteners as shown and disclosed in U.S. Pat. No. 5,542,691 to Marjanski et, al., for example.

The airbag cushion 30, the inflator 32 and the inflator sleeve 34 are positioned within the module housing 28 with the two studs 80,82 passing through the two fastener holes 44,46 defined by the base 40 of the module housing. The two fastener holes 44,46 defined by the base 40 can be slightly smaller in diameter than the two studs 80,82 and the base 40 can define expansion slots 84 radially extending from the fastener holes so that the holes can expand slightly to receive the studs yet tightly retain the studs. The inflator sleeve 34, the inflator 32, the airbag cushion 30 and the module housing 28 can then be shipped and handled as a single assembled unit prior to installation within a vehicle seat. The airbag cushion 30 can be folded either before or after being mounted within the module housing 28 and a tearable or rupturable wrapper (not shown) can be provided to hold the airbag cushion in a folded position, as is known in the art. The inflator access port 56 of the first end 52 of the sidewall 42 provides access to an end 33 of the inflator 32 so that an initiator squib (not shown) with wiring leading to a remote collision sensor can be connected to the inflator once the airbag module 10 is mounted within the seat 12.

Figure 6:
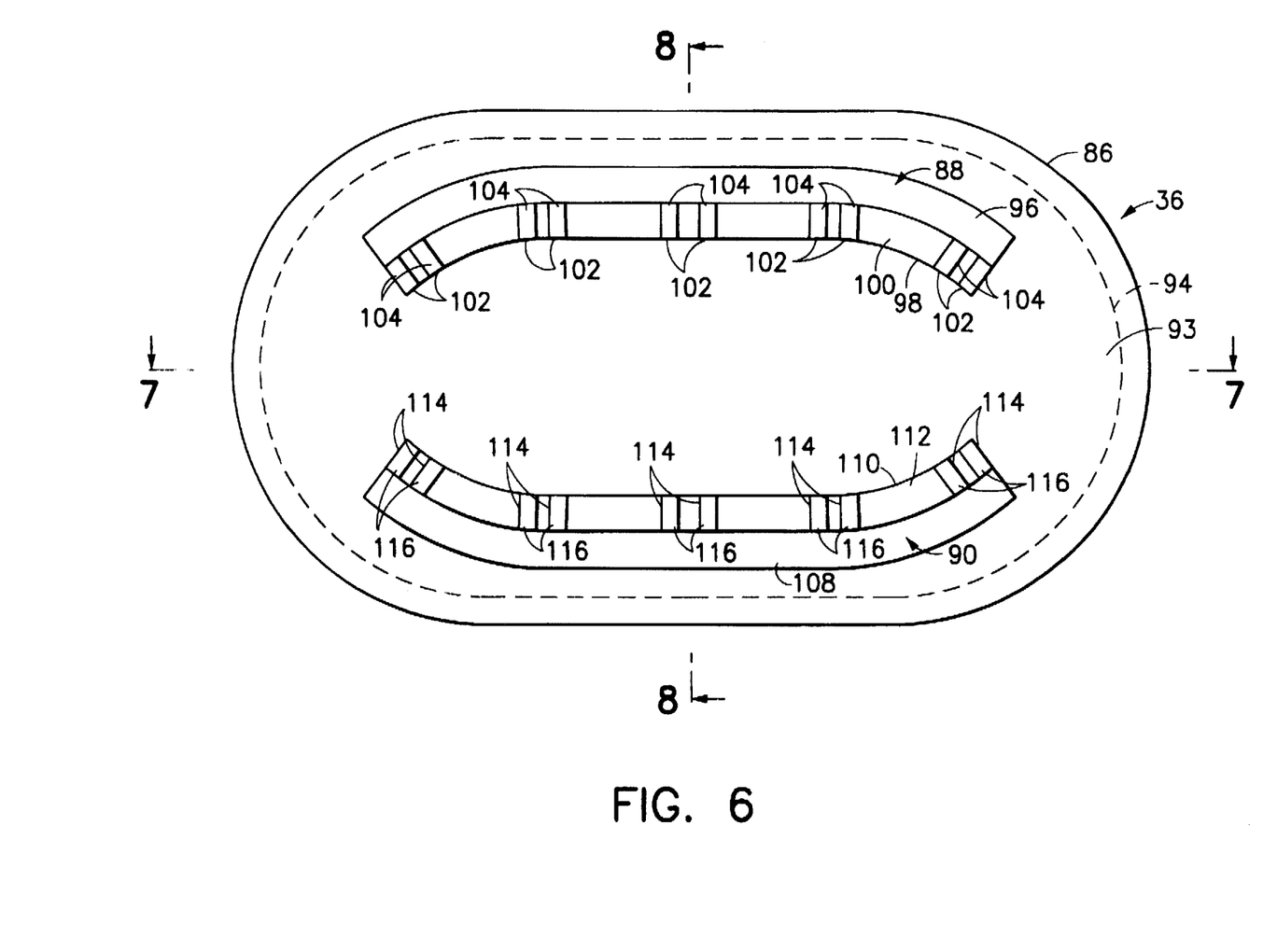
FIG. 6 is a bottom plan view of a module cover of the side airbag module of FIGS. 1 and 2.
Figure 7:
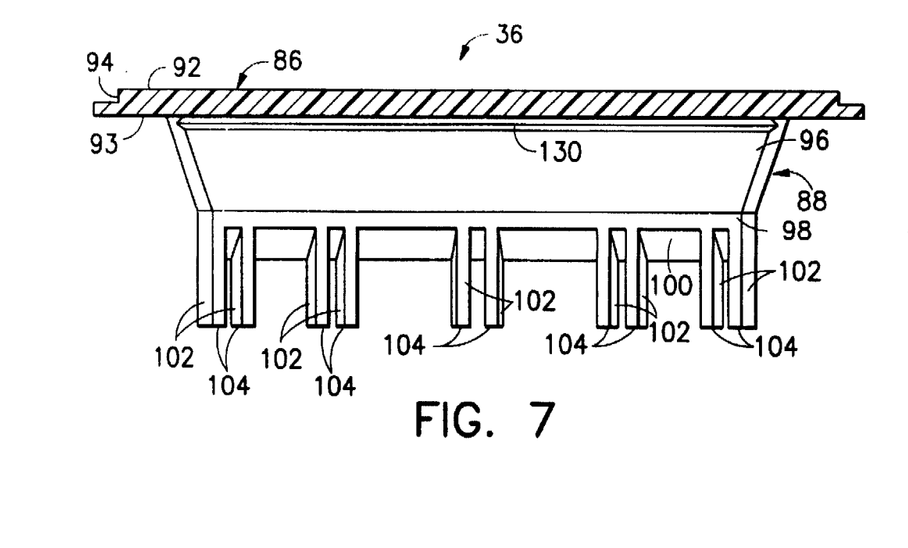
FIG. 7 is a sectional view of the module cover taken along the line 7—7 of FIG. 6.
Figure 8:
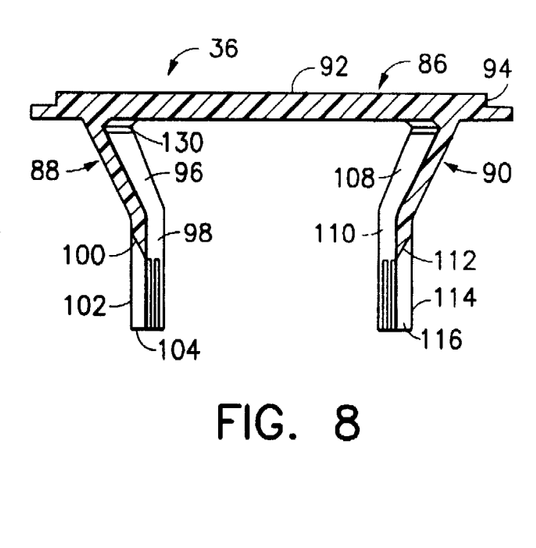
FIG. 8 is a sectional view of the module cover taken along the line 8—8 of FIG. 6.

Referring in particular to FIGS. 6 through 8, the module cover 36 is formed from a suitable material, preferably a thermoplastic elastomer polyester resin such as DYM100, a product of E.I. DuPont de Nemours Co., and the module cover includes a generally flat lid 86, a first attachment arm 88 and a second attachment arm 90. The lid 86 closes the open top 43 of the module housing 28 and conceals and protects the airbag cushion 30, inflator 32 and inflator sleeve 33, and a tear seam 130 is defined where the first attachment arm 88 meets the lid (the tear seam could alternatively be defined where the second attachment arm 90 meets the lid). The tear seam 130 is a thinned or weakened area of the first attachment arm 88 that is designed to rupture upon inflation of the airbag cushion 30 to allow the lid 86 to swing out of the path of the inflating airbag cushion about the second attachment arm 90. Alternatively, one or more tear seams can be defined by the lid 86 as opposed to the first attachment arm 88. Since the airbag module 10 is adapted to be mounted on the exterior of the seat 12, it is important that an outer surface 92 of the lid be aesthetically pleasing and blend in with the seat as much as possible. The lid 86, therefore, is provided with a class A, decorative, outer surface 92 (class refers to the quality of the surface with regards to looks, texture and other factors, with class A being the best available surface quality). An outer peripheral edge of the lid 86 defines a recessed, peripheral step 94 in the outer surface 92 for mating with the trim ring 38 as discussed below.

The first attachment arm 88 includes a first segment 96 extending from an inner surface 93 of the lid 86 generally at an angle corresponding to the slope of the first side 48 of the sidewall 42 of the module housing 28 and a second segment 98 extending from the first segment generally perpendicular to the lid and terminating at an angled bottom edge 100 butting against an inner surface 132 of the first side of the sidewall in alignment with the first row of cover openings 58. Five (5) spaced-apart pairs of stakes 102 extend from the bottom edge 100 and extend through, respectively, the five pairs of cover openings 58 of the first row of cover openings defined by the first side 48 of the sidewall 42 of the module housing 28 and terminate at distal ends 104. Referring also to FIG. 2, the two distal ends 104 of each pair of stakes 102 are heated, by ultrasonic welding, pneumatic welding, induction welding, fusion welding or vibration welding for example, and joined to form a bridge 106 abutting an outer surface 134 of the first side 48 of the sidewall 42 to secure the stakes within the cover openings.

Figure 9:
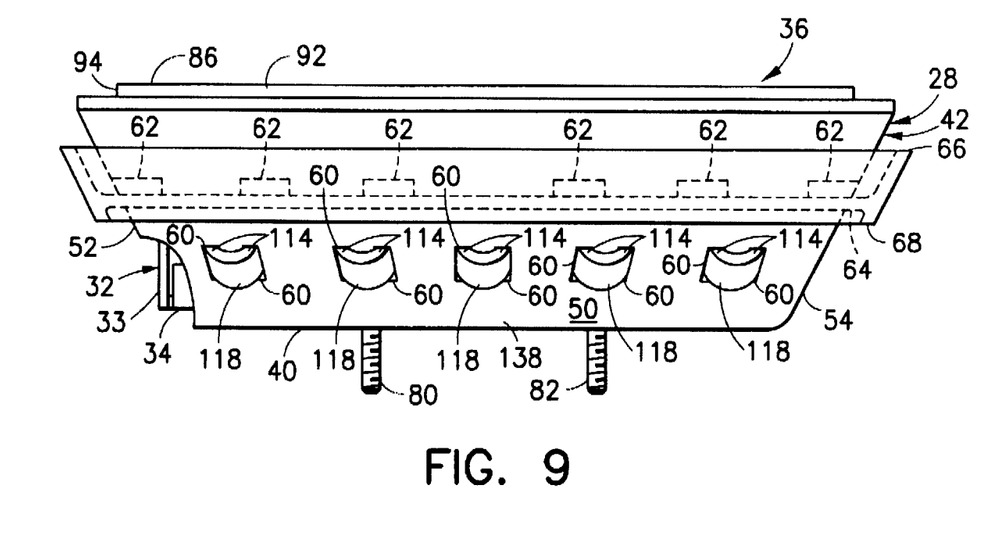
FIG. 9 is a side plan view showing the module cover secured to the module housing.

The second attachment arm 90 includes a first segment 108 extending from the inner face of the lid 86 generally at an angle corresponding to the slope of the second side 50 of the sidewall 42 of the module housing 28, and a second segment 110 extending from the first segment generally perpendicular to the lid and terminating at an angled bottom edge 112 butting against an inner surface 136 of the second side of the sidewall, in alignment with the second row of cover openings 60. Five (5) spaced-apart pairs of stakes 114 extend from the bottom edge 112 and extend through, respectively, the five pairs of cover openings 60 of the second row of cover openings defined by the second side 50 the sidewall 42 of the module housing 28 and terminate at distal ends 116. Referring also to FIG. 9, the distal ends 116 of each pair of stakes 114 are also heated and joined to form a bridge 118 abutting an outer surface 138 of the second side 50 of the sidewall 42 to secure the stakes within the cover openings and secure the module cover 36 to the module housing 28. It should be noted that more or fewer pairs of stakes and cover openings can be provided depending upon the size of the airbag module. In addition, the stakes 102,114 of the first and the second attachment arms 88,90 and the cover openings 58,60 of the first and the second rows of cover openings can alternatively be provided as singles as opposed to pairs. Instead of forming bridges, the distal end of each stake would be heated and formed into a mushroom-shaped head larger than the cover openings and abutting the outer surface of the sidewall to secure the stakes in the cover openings.

Once the airbag cushion 30, the inflator 32 and the inflator sleeve 34 are mounted within the module housing 28 and the module cover 36 is secured to the module housing, the airbag module 10 is ready to be mounted within the recess 14 of the seat 12 as shown in FIGS. 1 and 2. The airbag module 10 can either be mounted to the seat 12 by the seat manufacturer during assembly of the seat or later, after the seat has been assembled, by the automobile manufacturer during assembly of an automobile. The module housing 28 is positioned in the recess 14, base 40 first, so that the lid 86 of the module cover 36 is level with the surrounding seat upholstery 26. The two threaded mounting studs 80,82 of the inflator sleeve 34 extend through the two bolt holes 18,20 defined by the structural member 22 of the seat 12 and are fastened with two nuts 120,122 to firmly secure the airbag module 10 within the seat. If the airbag module 10 is to be mounted to an assembled seat 12, the seat will have to provide access for the nuts 120,122 to be fastened to the mounting studs 80,82. As shown best in FIG. 2, the second portion 68 of the flange 67 of the rail 64 of the module housing 28 catches the fabric hook 24 sewn to the surrounding seat upholstery 26 to pull and secure the upholstery tightly around the airbag module 10.

Figure 10:
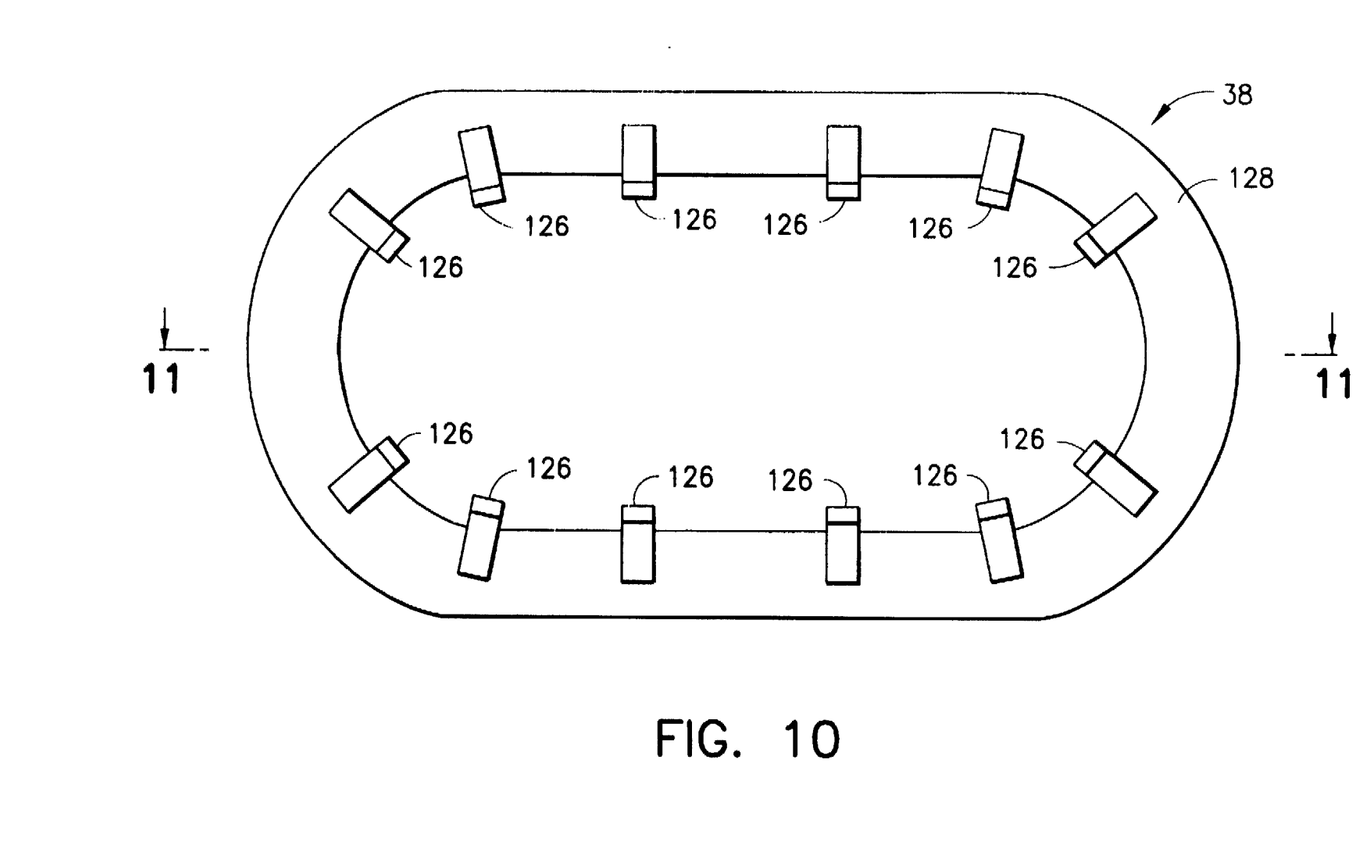
FIG. 10 is a bottom plan view of a trim ring of the side airbag module of FIGS. 1 and 2.
Figure 11:
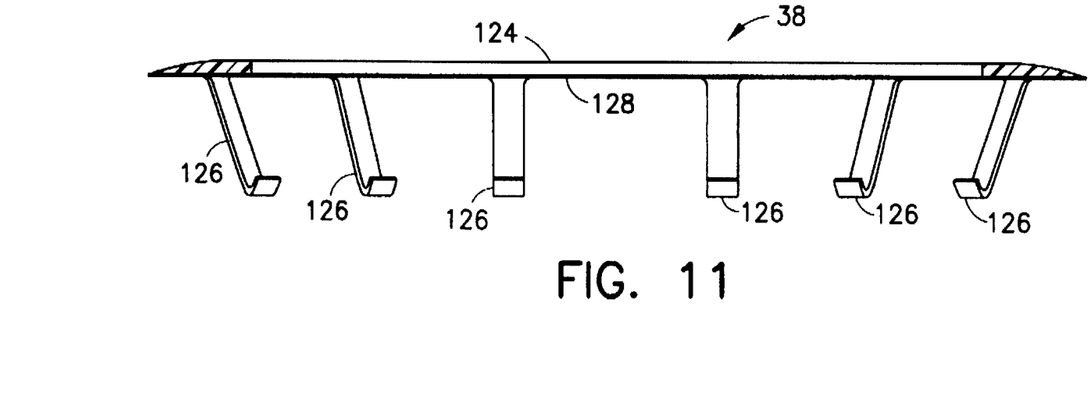
FIG. 11 is a sectional view of the trim ring taken along the line 11—11 of FIG. 10.

Referring also to FIGS. 10 and 11, the trim ring 38 has a decorative top surface 124 and twelve spaced-apart flat trim hooks 126 extending from a bottom surface 128 of the trim ring. The trim ring 38 mates with the peripheral step 94 defined by the outer surface 92 of the lid 86 of the module cover 36 and covers any gap between the lid and the recess 14 of the seat 12 and an outer periphery 15 of the recess. The twelve trim hooks 126 catch and are secured in, respectively, the twelve trim openings 62 of the row of trim openings defined by the sidewall 42 of the module housing 28 to secure the trim ring 38 to the module housing. As shown best in FIG. 2, the rail 64 and the first portion 66 of the flange extending over the trim openings 62 help guide the trim hooks 126 into the trim openings. Again, the number of trim hooks 126 and the corresponding number of trim openings 62 can be varied.

In summary, the present invention provides a side airbag module 10 that securely and easily mounts to the exterior of a vehicle seat 12 and does not require substantial changes to the outer contour of the seat or an external attachment means provided by the seat manufacturer. Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. An airbag module housing for use as part of a side airbag module for mounting in a vehicle seat, the airbag module housing comprising:

an elongated, generally flat base and a sidewall extending upwardly from the base to an open top of the module housing, the sidewall having a first side and an opposing second side; and an elongated first rail portion running along an outer face of the first side of the sidewall and an elongated second rail portion running along an outer face of the second side of the sidewall, each of the first and the second rail portions being generally parallel with the open top and having a flange for catching a fabric hook of the vehicle seat.

2. An airbag module housing according to claim 1 further comprising a first row of spaced-apart cover openings defined in the first side of the sidewall generally parallel with the open top, and a second row of spaced-apart cover openings defined in the second side of the sidewall generally parallel with the open top.

3. An airbag module housing according to claim 2 wherein the sidewall is substantially continuous and further includes a first end and an opposing second end, the first end defining an inflator access port, and wherein the first rail portion and the second rail portion are part of a substantially continuous rail encircling the substantially continuous sidewall.

4. An airbag module housing according to claim 3 further comprising a substantially continuous row of spaced-apart trim openings defined in the sidewall generally parallel with the open top.

5. An airbag module housing according to claim 4 wherein the rail is positioned above the first and the second rows of cover openings and below the row of trim openings.

6. An airbag module housing according to claim 5 wherein the flange of the rail includes a first portion extending over the row of the trim openings and a lower portion for catching the fabric hook of the vehicle seat.

7. An airbag module housing according to claim 1 wherein the base defines at least one fastener aperture.

8. An airbag module housing ac according to claim 1 wherein the cover openings of the first row of cover openings are provided in pairs, and the cover openings of the second row of cover openings are provided in pairs.

9. A side airbag module adapted to mount within an external recess of a vehicle seat, the recess providing access to an internal structural member of the seat with a substantially continuous fabric hook connected to upholstery surrounding the recess, the side airbag module comprising:

A) an airbag module housing including, an elongated generally flat base and a sidewall extending upwardly from the base to an open top of the module housing, the sidewall having a first side and an opposing second side, and an elongated first rail portion running along an outer surface of the first side of the sidewall generally parallel with the open top, and an elongated second rail portion running along an outer surface of the second side of the sidewall generally parallel with the open top, the module housing fitable within the recess of the vehicle seat with the open top facing out of the recess and the first and the second rail portions each having a flange adapted to catch the fabric hook to pull the seat upholstery tightly around the recess;

B) an inflator and a folded airbag cushion in communication so that inflation gas from the inflator will inflate the airbag cushion, the airbag cushion and the inflator secured within the module housing with the airbag cushion positioned between the inflator and the open top of the module housing;

C) a module cover defining at least one tear seam and including a lid closing the open top of the module housing, and means securing the lid to the module housing; and D) means for securing the airbag module to the internal structural member of the seat.

10. A side airbag module according to claim 9 wherein:
the sidewall of the module housing is substantially continuous and further includes a first end and an opposing second end, the first end defining an inflator access port; and
the first rail portion and the second rail portion of the module housing are part of a substantially continuous rail running along the substantially continuous sidewall of the module housing.

11. A side airbag module according to claim 10 wherein the module housing further includes a substantially continuous row of spaced-apart trim openings defined in the sidewall generally parallel with the open top, the airbag module further comprising:
a generally flat trim ring covering an outer peripheral edge of the lid of the module cover and adapted to cover any gap between the recess of the seat and the lid and an outer periphery of the recess, the trim ring having a plurality of spaced-apart trim hooks extending from the trim ring, with each trim hook secured in a trim opening of the row of trim openings of the module housing, securing the trim ring to the airbag module.

12. A side airbag module according to claim 11 wherein:
A) the module housing further includes a first row of spaced-apart cover openings defined in the first side of the sidewall generally parallel with the open top, and a second row of spaced-apart cover openings defined in the second side of the sidewall generally parallel with the open top; and
B) means securing the module cover to the module housing comprises,
a first attachment arm extending from the lid and terminating at a bottom edge butting against an inner face of the first side of the sidewall of the module housing in alignment with the first row of cover openings, a plurality of spaced-apart stakes extending from the bottom edge of the first attachment arm, each of the stakes extending through one of the openings of the first row of cover openings and terminating at distal ends with means securing the distal ends of each stake against an outer face of the first side of the sidewall so that the stakes cannot be withdrawn from the openings, and
a second attachment arm extending from the lid and terminating at a bottom edge butting against an inner face of the second side of the sidewall of the module housing in alignment with the second row of cover openings, a plurality of spaced-apart stakes extending from the bottom edge of the second attachment arm, each of the stakes extending through one of the openings of the second row of cover openings and terminating in distal ends with means securing said distal ends of each stake against an outer face of the second side of the sidewall so that the stakes cannot be withdrawn from said openings.

13. A side airbag module according to claim 12 wherein the rail is positioned below the row of trim openings, with the flange of the rail including a top portion that overhangs the row of trim openings and a lower portion for catching the fabric hook of the seat.

14. A side airbag module according to claim 12 wherein the means for securing the airbag module to the internal structural member of the seat comprises at least one mounting projection extending from the airbag module and adapted to extend into the internal structural member of the seat and be secured therein.

15. A side airbag module according to claim 14 wherein:
the base of the module housing defines at least one mounting projection aperture; and
the inflator is secured in an inflator sleeve having the at least one mounting projection of the airbag module extending therefrom, and the inflator and inflator sleeve are at least partially contained within the folded airbag cushion with the mounting projection extending through a first side and a second side of a mouth of the airbag cushion and through the at least one mounting projection aperture of the base.

16. A side airbag module according to claim 9 wherein:
A) the module housing further includes a first row of spaced-apart cover openings defined in the first side of the sidewall generally parallel with the open top, and a second row of spaced-apart cover openings defined in the second side of the sidewall generally parallel with the open top; and
B) means securing the module cover to the module housing comprises,
a first attachment arm extending from the lid and terminating at a bottom edge butting against an inner face of the first side of the sidewall of the module housing in alignment with the first row of cover openings, a plurality of spaced-apart stakes extending from the bottom edge of the first attachment arm, each of the stakes extending through one of the openings of the first row of cover openings and terminating at distal ends with means securing the distal ends of each stake against an outer face of the first side of the sidewall so that the stakes cannot be withdrawn from the openings, and
a second attachment arm extending from the lid and terminating at a bottom edge butting against an inner face of the second side of the sidewall of the module housing in alignment with the second row of cover openings, a plurality of spaced-apart stakes extending from the bottom edge of the second attachment arm, each of the stakes extending through one of the openings of the second row of cover openings and terminating in distal ends with means securing said distal ends of each stake against an outer face of the second side of the sidewall so that the stakes cannot be withdrawn from said openings.

17. A side airbag module adapted to mount within an external recess of an vehicle seat, the recess providing access to an internal structural member of the seat, the side airbag module comprising:

A) an airbag module housing including,
an elongated generally flat base and a sidewall extending upwardly from the base to an open top of the module housing, the sidewall having a first side and an opposing second side, and
a first row of spaced-apart cover openings defined in the first side of the sidewall generally parallel with the open top, and a second row of spaced-apart cover openings defined in the second side of the sidewall generally parallel with the open top, the module housing fitable within the recess of the vehicle seat with the open top facing out of the recess;

B) an inflator and a folded airbag cushion in communication so that inflation gas from the inflator will inflate the airbag cushion, the airbag cushion and the inflator secured within the module housing with the airbag cushion positioned between the inflator and the open top of the module housing;

C) a module cover defining at least one tear seam and including,
a generally flat lid closing the open top of the module housing,
a first attachment arm extending from the lid and terminating at a bottom edge butting against an inner surface of the first side of the sidewall of the module housing in alignment with the first row of cover openings, a plurality of spaced-apart stakes extending from the bottom edge of the first attachment arm, each of the stakes extending through one of the openings of the first row of cover openings and terminating at distal ends with means securing the distal ends of each stake against an outer surface of the first side of the sidewall so that the stakes cannot be withdrawn from the openings, and
a second attachment arm extending from the lid and terminating at a bottom edge butting against an inner surface of the second side of the sidewall of the module housing in alignment with the second row of cover openings, a plurality of spaced-apart stakes extending from the bottom edge of the second attachment arm, each of the stakes extending through one of the openings of the second row of cover openings and terminating in distal ends with means securing said distal ends of each stake against an outer surface of the second side of the sidewall so that the stakes cannot be withdrawn from said openings; and D) means for securing the airbag module to the internal structural member of the vehicle seat.

18. A side airbag module according to claim 17 wherein:
the sidewall of the module housing is substantially continuous and further includes a first end and an opposing second end, the first end defining an inflator access port;
the module housing further includes a substantially continuous row of spaced-apart trim openings defined in the sidewall generally parallel with the open top; and
the airbag module further comprises a generally flat trim ring covering an outer peripheral edge of the lid of the module cover and adapted to cover any gap between the recess of the seat and the lid and the outer periphery of the recess, the trim ring having a plurality of spaced-apart trim hooks, with each trim hook secured in a trim opening of the row of trim openings of the module housing, securing the trim ring to the airbag module.

19. A side airbag module according to claim 18 wherein the means for securing the airbag module to the internal structural member of the vehicle seat comprises at least one mounting projection extending from the airbag module and adapted to extend into the internal structural member of the vehicle seat and be secured therein.

20. A side airbag module according to claim 19 wherein:
the base of the module housing defines at least one mounting projection aperture; and
the inflator is secured in an inflator sleeve having the at least one mounting projection of the airbag module extending therefrom, and the inflator and inflator sleeve are at least partially contained within the folded airbag cushion with the mounting projection extending through a first side and a second side of a mouth of the airbag cushion and through the at least one mounting projection aperture of the base.

21. A vehicle seat assembly comprising:
A) a vehicle seat having an external recess, the recess providing access to an internal structural member of the seat with a substantially continuous fabric hook connected to upholstery surrounding the recess; and
B) a side airbag module including,
1) an airbag module housing including,
an elongated generally flat base and a sidewall extending upwardly from the base to an open top of the module housing, the sidewall having a first side and an opposing second side, and
an elongated first rail portion running along an outer surface of the first side of the sidewall generally parallel with the open top, and an elongated second rail portion running along an outer surface of the second side of the sidewall generally parallel with the open top, the module housing fitting within the recess of the vehicle seat with the open top facing out of the recess and the first and the second rail portions each having a flange catching the fabric hook and pulling the seat upholstery tightly around the recess;
2) an inflator and a folded airbag cushion in communication so that inflation gas from the inflator will inflate the airbag cushion, the airbag cushion and the inflator secured within the module housing with the airbag cushion positioned between the inflator and the open top of the module housing;
3) a module cover defining at least one tear seam and including a lid closing the open top of the module housing, and means securing the lid to the module housing; and
4) means securing the airbag module to the internal structural member of the vehicle seat.

22. A vehicle seat assembly comprising:
A) a vehicle seat having an external recess, the recess providing access to an internal structural member of the seat; and
B) a side airbag module including,
1) an airbag module housing including,
an elongated generally flat base and a sidewall extending upwardly from the base to an open top of the module housing, the sidewall having a first side and an opposing second side, and
a first row of spaced-apart cover openings defined in the first side of the sidewall generally parallel with the open top, and a second row of spaced-apart cover openings defined in the second side of the sidewall generally parallel with the open top, the module housing fitting within the recess of the vehicle seat with the open top facing out of the recess;

2) an inflator and a folded airbag cushion in communication so that inflation gas from the inflator will inflate the airbag cushion, the airbag cushion and the inflator secured within the module housing with the airbag cushion positioned between the inflator and the open top of the module housing;

3) a module cover defining at least one tear seam and including, a generally flat lid closing the open top of the module housing, a first attachment arm extending from the lid and terminating at a bottom edge butting against an inner surface of the first side of the sidewall of the module housing in alignment with the first row of cover openings, a plurality of spaced-apart stakes extending from the bottom edge of the first attachment arm, each of the stakes extending through one of the openings of the first row of cover openings and terminating at distal ends with means securing the distal ends of each stake against an outer surface of the first side of the sidewall so that the stakes cannot be withdrawn from the openings, and a second attachment arm extending from the lid and terminating at a bottom edge butting against an inner surface of the second side of the sidewall of the module housing in alignment with the second row of cover openings, a plurality of spaced-apart stakes extending from the bottom edge of the second attachment arm, each of the stakes extending through one of the openings of the second row of cover openings and terminating in distal ends with means securing said distal ends of each stake against an outer surface of the second side of the sidewall so that the stakes cannot be withdrawn from said openings; and 4) means securing the airbag module to the internal structural member of the vehicle seat.

* * * * *